Jan. 25, 1949. T. W. GRIFFITHS 2,459,812
WELDING APPARATUS
Filed May 31, 1946

INVENTOR.
Thomas W. Griffiths
BY
Percy P. Lantz
ATTORNEY

Patented Jan. 25, 1949

2,459,812

UNITED STATES PATENT OFFICE 2,459,812

WELDING APPARATUS

Thomas W. Griffiths, Newark, N. J., assignor to Federal Telephone and Radio Corporation, New York, N. Y., a corporation of Delaware Application May 31, 1946, Serial No. 673,213

4 Claims. (Cl. 219—14)

1

This invention relates to a protecting cover to be placed over an article being welded and more particularly to a protecting cover, work support and light filter to be used in a welding operation where the welding operation is carried out in an atmosphere of hydrogen.

The use of a protecting cover in the form of a bell jar is desirable in connection with the welding of delicate parts of radio tubes. The radio tubes upon which this particular type of welding process and welding equipment have been found most useful are high-powered tubes used mostly in transmitters although other uses have been found for the process and equipment as well. The important point in using the particular process and equipment is that the material being welded must be welded in a hydrogen or other inflammable gas in order to avoid oxidation of the parts being welded. Heretofore an operator would hold the welding electrode from the bottom of the jar and watch the work through the side of the jar. Small molten particles fall from the article being welded and work support during the welding operation and sometimes ignite the oxygen-hydrogen or other inflammable mixture that collects at the bottom of the jar which causes an explosion of that strata thus burning the hands of an operator unless they are properly covered. As a result, the operator must wear gloves and this is a hindrance to careful welding and also causes the hands to perspire. In operation of the welding process, hydrogen or other gas is introduced at the top of the jar and continually supplied in order to keep the jar completely filled with the desired gas. The gas, of course, will flow from the bottom or lower end of the jar in a continuous stream.

It is an object of the invention among others to provide a protecting cover, work support and light filter to carry out a welding process in an atmosphere of hydrogen wherein the equipment for carrying out the welding process is made safer for operation; to improve the conditions under which an operator works, to provide equipment that is simple and economical in construction and durable and long lasting in operation.

In carrying out the objects of the invention there is provided a protecting cover that is placed over an article being welded wherein the welding operation takes place in an atmosphere of hydrogen, a gas herein referred to by way of example only, comprising a bell shaped member with an opening in the top to enter hydrogen into the bell shaped member. There is also an opening in the side of the bell shaped member through which a welding electrode is entered into the bell shaped member. The electrode is flexibly mounted and sealed with the bell shaped member. The bell shaped member is transparent and is open at the bottom. The electrode is flexibly mounted to the bell shaped member by a bellows member which has one end thereof attached to the side of the bell shaped member and surrounds the opening while the other end of the bellows is attached to the welding electrode. A gasket seals the space between the bellows and electrode and allows movement of the electrode through the gasket without breaking the seal.

There is provided a work support to hold an article to be welded which work support is adjustable vertically and over which the bell shaped member is placed and supported by grasping the electrode. Connected to the work support is a foldable screen which opens to contact the bell shaped member when the bell shaped member is in place over the work support to catch any particles of molten metal falling from the article being welded.

Also in combination with the work support and bell shaped member is a light shutter which is associated with the welding electrode and placed between the work support and an operator. The light shutter is arranged to close and attenuate the light of the arc just before the electrical switch is closed which allows electric current to flow to the welding electrode.

With the foregoing and other objects in view, the invention will be more fully described hereinafter and will be particularly pointed out in the claims appended hereto.

In the drawings, wherein like symbols refer to like or corresponding parts throughout the several views.

Figure 1:
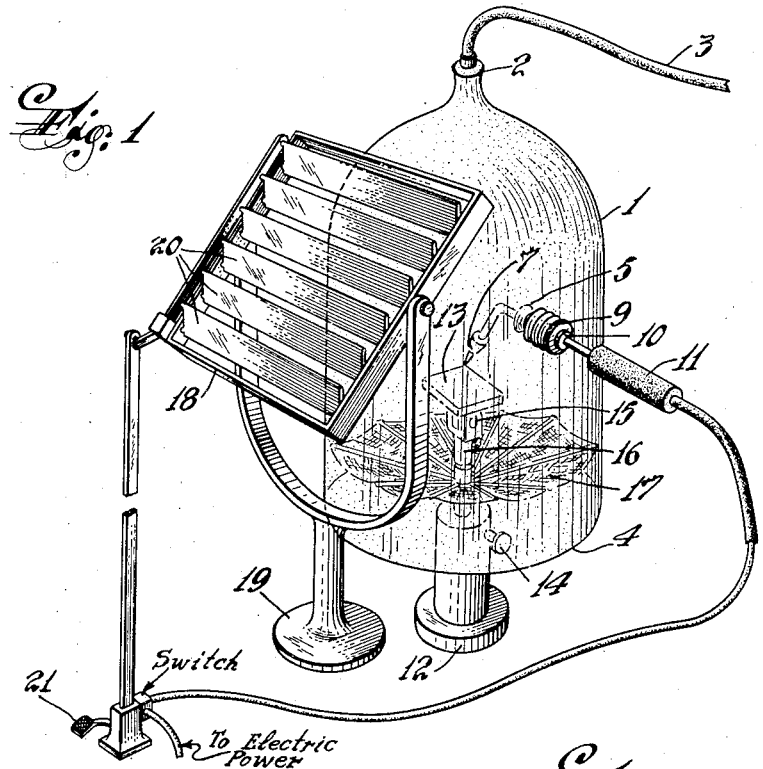
Figure 1 is a perspective view showing the work support, bell shaped protective cover, welding electrode and light filter in assembled relation.

Referring to Figure 1 of the drawings, a protective cover is represented at 1 and is in the shape of a bell shaped member and is transparent. The bell shaped protective cover 1 has been made of glass but may be made of any other material that is transparent and will stand the heat. At the top of the bell shaped member 1 is an opening 2 to which a tube 3 connects and hydrogen gas may be delivered to the interior of the bell shaped member 1 through tube 3 and opening 2. The bottom portion 4 of the bell shaped member 1 is left entirely open hence hydrogen from the interior of bell shaped member 1 may flow out the open bottom portion 4 and a steady flow of hydrogen maintained through the bell shaped member 1 at all times.

Figure 2:
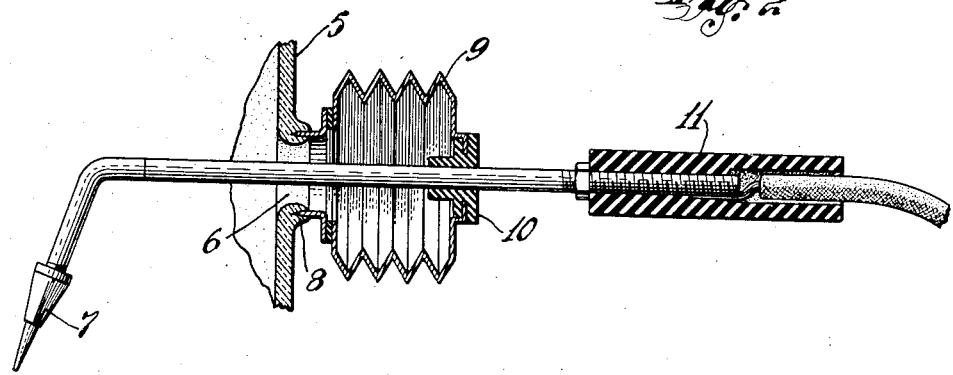
Figure 2 is a part sectional and part elevational view showing the welding electrode passing through the bell shaped member with the bellows and seal to flexibly connect the welding electrode to the bell shaped member in section.

In the side wall 5 of the bell shaped member 1 (see Figure 2) there is an opening 6 through which a welding electrode 7 having a carbon or tungsten electrode or tip may extend into the interior of the bell shaped member 1. It is necessary to seal opening 6 in order to insure a pure hydrogen atmosphere within the bell shaped member 1 and any sealed joint must be flexible so as to have freedom of movement of the welding electrode 7 within the bell shaped member 1. The side wall 5 of the bell shaped member 1 has a projecting portion 8 around the opening 6 which receives one end of a bellows 9. The end of the bellows may be placed in the projection 8 when it is in molten state or any type of adhesive may be used to join the bellows to the glass projection 8. At the other end of bellows 9 is a sealing member 10 through which the welding electrode 7 passes. The sealing member 10 may be of any suitable material but the material must possess elasticity to allow the welding electrode 7 to be moved in and out of the sealing member 10 and up and down without breaking the seal. The welding electrode has a handle 11 preferably of Bakelite which an operator grasps to support both the welding electrode 7 and the bell shaped member 1 when a welding operation is taking place.

Figure 3:
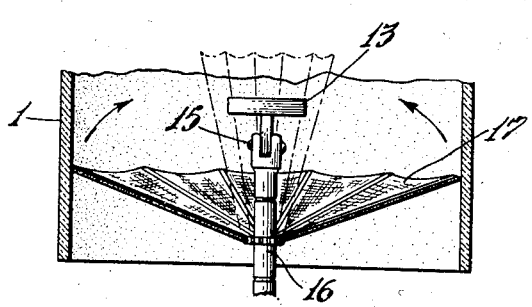
Figure 3 is a part sectional and part elevational view showing the bell shaped member over the work support with a screen member closing the space between the two.

There is also provided a work support 12 having a head portion 13 or holding jig to receive an article to be welded. The head portion 13 is adjustable vertically within the work support 12 and is clamped in place when adjusted by wing nut 14. The head portion is also movable slightly in view of a pivotal connection 15 with vertically extensible member 16 to allow for angularly adjusting the article being welded. The vertically extensible member 16 has connected thereto a foldable screen 17 shown collapsed in dotted lines in Figure 3, and extended in full lines in Figure 3. The foldable screen is similar to an umbrella in design and operation. The screen is of small mesh to catch small particles and the screen may be manipulated by hand to fold or unfold into place.

In operation, an operator grasps the handle 11 on welding electrode 7 and prepares to start the welding operation. An article to be welded is placed on the head portion 13 and the bell shaped member 1 and welding electrode 7 are put into position over the work support 12 with the foldable screen 17 held up in the dotted line position of Figure 3 until the bell shaped member 1 is in place after which the screen 17 is allowed to drop into the full line position of Figure 3. In the full line position of Figure 3 the screen 17 contacts the bell shaped member 1 thus closing the space between the bell shaped member 1 and the work support 12 and serves to collect any molten metal falling from the article being welded and reduces the explosion and fire hazard hence allowing an operator to work without gloves. When the bell shaped member 1 and welding rod 7 are in place, hydrogen is allowed to pass through hose 3 into bell shaped member 1 and the welding process is ready to proceed.

Also included in the combination is a shutter light filter 18, which may be attached permanently to bell shaped member 1 or may be supported on a separate standard 19 as shown in Figure 1. The shutter 18 is made of a series of colored glasses or other safety material strips 20 which when in a shut position protects the eyes of the operator during the welding operation. During the summer it is particularly annoying for an operator to wear goggles, hence the present shutter arrangement makes it possible for the operator to work without the use of goggles. The shutter is open when the current to the welding electrode is off and when the shutter is closed, electric current flows to the welding electrode 7. The shutter 18 is controlled by a foot pedal 21 which pedal 21 when pressed down closes strips 20. Pressing down of pedal 21 also actuates an electric switch to close the switch and allows electric current to pass welding electrode 7.

While the invention has been described in connection with several specific embodiments, it is to be understood that the words which have been used are words of description rather than limitation, and that practice of the invention within the scope of the appended claims may be resorted to without departing from the true scope of the invention in all its aspects.

I claim:
1. A welding apparatus for performing a welding operation on a work piece in an atmosphere of inflammable gas comprising a container for confining an inflammable gas around a work piece, said container having an opening at the top for introducing said inflammable gas into said container and an opening at the bottom for permitting the work piece to be inserted within the container and for permitting the gas to exhaust from the container, a porous shield positioned between said work piece and said bottom opening to prevent incandescent pieces of metal from falling through the opening while permitting said gas to pass through the shield.

2. An apparatus according to claim 1 wherein a work support is positioned through said bottom opening to support said work piece in said container and to support said shield.

3. An apparatus according to claim 2 wherein said shield is flexibly mounted on said support.

4. An apparatus according to claim 3 wherein said shield is of an umbrella shape flexibly mounted at the center to said work support and in the open position extending to the inside surface of said container.

THOMAS W. GRIFFITHS.

REFERENCES CITED

The following references are of record in the file of this patent:

UNITED STATES PATENTS

| Number | Name | Date |
| --- | --- | --- |
| 975,845 | Farkas | Mar. 15, 1910 |
| 1,093,197 | Morrison | Apr. 14, 1914 |
| 1,354,266 | Plant | Sept. 28, 1920 |
| 1,616,145 | Shipman | Feb. 1, 1927 |
| 2,336,283 | Neill | Dec. 7, 1943 |
| 2,373,041 | Martindell | Apr. 3, 1945 |